US012463413B2

(12) United States Patent
Jackson et al.

(10) Patent No.: US 12,463,413 B2
(45) Date of Patent: Nov. 4, 2025

(54) ELECTRONIC CIRCUIT FOR OVERCURRENT PROTECTION

(71) Applicant: SiliconBrite Technologies, Inc., Santa Clara, CA (US)

(72) Inventors: Cameron Nathan Jackson, Los Gatos, CA (US); Anthony Gerard Russell, San Jose, CA (US); Baris Karagozlu, Dublin, CA (US)

(73) Assignee: SiliconBrite Technologies, Inc., Santa Clara, CA (US)

( * ) Notice: Subject to any disclaimer, the term of this patent is extended or adjusted under 35 U.S.C. 154(b) by 246 days.

(21) Appl. No.: 18/133,966

(22) Filed: Apr. 12, 2023

(65) Prior Publication Data

US 2023/0253777 A1 Aug. 10, 2023

Related U.S. Application Data

(63) Continuation-in-part of application No. 17/519,475, filed on Nov. 4, 2021, now Pat. No. 11,670,935.

(60) Provisional application No. 63/167,653, filed on Mar. 30, 2021.

(51) Int. Cl.
*H02H 3/08* (2006.01)
(52) U.S. Cl.
CPC ..................... *H02H 3/08* (2013.01)
(58) Field of Classification Search
CPC ....... H02H 3/08; H02H 3/0935; H02H 1/0007
See application file for complete search history.

(56) References Cited

U.S. PATENT DOCUMENTS

| 4,291,265 A * | 9/1981 | Kawada | H02M 7/53875 |
| | | | 318/782 |
| 4,928,200 A * | 5/1990 | Redl | H02H 7/1227 |
| | | | 361/94 |
| 6,373,671 B1 * | 4/2002 | Watanabe | H03K 17/0822 |
| | | | 361/87 |
| 2010/0008106 A1 * | 1/2010 | Kawabe | H02M 3/33507 |
| | | | 363/21.01 |
| 2017/0201086 A1 * | 7/2017 | Chen | H03K 3/017 |
| 2020/0251894 A1 * | 8/2020 | Takuma | G06F 1/305 |
| 2021/0351583 A1 | 11/2021 | Shigeta | |

FOREIGN PATENT DOCUMENTS

EP 3944438 A1 1/2022

\* cited by examiner

*Primary Examiner* — Danny Nguyen
*Assistant Examiner* — Nicolas Bellido
(74) *Attorney, Agent, or Firm* — André Grouwstra (57) ABSTRACT

An electronic protection system includes an electronic protection IC, mains power lines including a line rail and a neutral rail, a power switch, and a current sense device. A load is coupled with the mains power lines via the power switch and the current sense device. The electronic protection circuit turns off the power switch within eighty (80) milliseconds from a zero crossing in power delivered by the mains power lines when a load current is too high. A dummy DAC supplies a dummy current to prevent instability resulting from positive feedback during a change between a first state and a second state. The system may include an overcurrent detection circuit with a sense input, a comparator, a latch, and a pulse generator, configured to output a train of pulses with a low duty cycle when a current amplitude exceeds a reference value.

8 Claims, 7 Drawing Sheets

ELECTRONIC CIRCUIT FOR OVERCURRENT PROTECTION

REFERENCES

This application is a continuation-in-part of U.S. application Ser. No. 17/519,475, entitled "Electronic Protection Circuit with Instability Prevention", filed on Nov. 4, 2021, which claims priority from U.S. provisional patent application Ser. No. 63/167,653, entitled "Electronic Fuse System and Method", filed on Mar. 30, 2021, and U.S. provisional patent application Ser. No. 63/231,886, entitled "High-Reliability Low-Loss Power Switch and Driver IC", filed on Aug. 11, 2021. The priority documents are hereby incorporated by reference as if set forth in full in this application for all purposes.

BACKGROUND

Technical Field

The disclosed implementations relate generally to systems and methods used in power management, and in particular to those for overvoltage, undervoltage, and overcurrent protection systems for electric and electronic equipment. The technology may be implemented as one or more integrated circuits or otherwise. Implementations may be used for protection against undervoltage, overvoltage, and overcurrent events, but may also be used for sensing and precision monitoring.

Context

Unpredictable fluctuations in power supplied by alternating-current (AC) mains lines cause damage to electronic and electric equipment, which may result in economic loss and worse. They may also cause interference, resulting in incorrect or unsafe operation of sensitive equipment.

Unless otherwise indicated herein, elements described in this section are not prior art to the claims and are not admitted being prior art by inclusion in this section.

SUMMARY

The disclosed technology recognizes that in an electronic protection circuit not all instabilities are caused by natural noise occurring on the mains voltage, but some may be caused by positive feedback problems due to operational nonlinearities. An electronic protection system protects an external load from, for example, overvoltage, undervoltage, or overcurrent conditions on mains supply lines, by disconnecting the load from the mains supply lines when a dangerous condition occurs. A requirement to perform highly efficiently leaves a tiny energy budget for an electronic protection system. The energy flowing in and out of an integrated circuit (IC) at its sense and switch driver terminals may be significant relative to the power used internally. Activating the protection takes extra power, both for internal operation and for devices connected to its pins, as a result of which the IC's internal supply levels may change, impacting reference voltages used for operational thresholds. An impact can be negative, creating an inherently stable feedback loop, or positive, creating an inherently instable feedback loop. Implementations use one or more variable dummy currents and/or external filters associated with currents flowing in and out of pins to reduce or invert supply current discontinuities during threshold crossings. A dummy current may be generated with a DAC, a dummy resistor, or with a dummy current source. A DAC with current source output may be controlled by the supply voltage level. The reduced or inverted power swings reduce or cancel the positive feedback during threshold crossings, turning implementations stable.

In a first aspect, an implementation provides an electronic protection system that includes an electronic protection circuit. The electronic protection circuit may be an IC with a supply terminal, a common terminal, a first condition sense terminal, a zero-crossing sense terminal, and a switch driver output terminal. The electronic protection system further includes mains power lines including a line rail and a neutral rail, a power switch, and a current sense device. A load may be coupled with the mains power lines via the power switch and the current sense device. The common terminal is coupled with one of the mains power lines. The first condition sense terminal is coupled with the current sense device. The electronic protection circuit is configured to turn off the power switch within eighty (80) milliseconds when a load current that has been sensed by the current sense device is too high. The electronic protection circuit includes a dummy DAC configured to supply a dummy current that prevents instability resulting from positive feedback during a change from a first state to a second state or during a change from the second state to the first state, wherein the dummy current flows from the supply terminal through the dummy DAC to the common terminal. The current sense device may be, or include, a resistor, a current loop, or a current sense transformer.

In a second aspect, an implementation provides an overcurrent sense circuit. The overcurrent sense circuit comprises a sense input, a first comparator, a first latch, and a first pulse generator. The first comparator has a first comparator input coupled with the sense input and a second comparator input coupled with a first reference. The latch has a set input (S) coupled with an output of the first comparator, a reset input (R) coupled with a reset terminal, and an output (Q). The first pulse generator has an input coupled with the first latch Q output and an output coupled with a first overcurrent sense circuit output terminal, which is configured as a current output which may source a current. The pulse generator has a duty cycle of less than thirty-three (33) percent. The overcurrent sense circuit may further include a dummy digital-to-analog converter (DAC) configured to draw a dummy current from a supply terminal to a common terminal after a sensed condition changes and before the latch changes from or to the first stable latch state. The overcurrent sense circuit is configured to compare a positive current amplitude with a first reference value and output a train of pulses when the positive current amplitude exceeds the first reference value.

In a third aspect, an implementation provides a method to protect a load from an overcurrent condition in a load current flowing through a line rail, a neutral rail, and the load. The method includes the following steps. (a) In an electronic protection circuit, initializing a dummy current to a first value; (b) from the electronic protection circuit, providing a first switch signal to a switch to couple the load to the line rail and/or the neutral rail, wherein the switch is coupled between the load and one of the line rail and the neutral rail; (c) providing a load current sense signal to the electronic protection circuit, and in the electronic protection circuit, determining if a peak value of the load current is in an allowed range by comparing the load current sense signal with a threshold value; (d) upon determining that the peak value of the load current is in the allowed range, returning to step (c); (e) upon determining that the peak value of the load current is not in the allowed range, changing the dummy current to a second value; and (f) from the electronic protection circuit, providing a second switch signal to the switch to decouple the load from the line rail and the neutral rail.

A further understanding of the nature and the advantages of particular implementations disclosed herein may be realized by reference of the remaining portions of the specification and the attached drawings.

BRIEF DESCRIPTION OF THE DRAWINGS

The disclosed technology will be described with reference to the drawings, in which.

In the figures, like reference numbers may indicate functionally similar elements. The systems and methods illustrated in the figures, and described in the Detailed Description below, may be arranged and designed in a wide variety of different implementations. Neither the figures, nor the Detailed Description, are intended to limit the scope as claimed. Instead, they merely represent examples of different implementations of the disclosed technology.

DETAILED DESCRIPTION

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms comprising and consisting have different meanings in this patent document. An apparatus, method, or product "comprising" (or "including") certain features means that it includes those features but does not exclude the presence of other features. On the other hand, if the apparatus, method, or product "consists of" or "contains" certain features, the presence of any additional features is excluded.

The term coupled is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that an electric path exists), capacitive, inductive, electromagnetic, optical, or through any other process allowed by physics.

The term connected is used to indicate a direct connection, such as electrical, optical, electromagnetic, or mechanical, between the things that are connected, without any intervening things or devices.

The following terms or acronyms used herein are defined at least in part as follows:

AC—alternating current—an electric current that reverses its direction regularly or irregularly.

DAC—digital-to-analog converter

DC—direct current—an electric current that flows in only one direction.

DMOS—double-diffused MOSFET

IC—integrated circuit—this may be a monolithically integrated circuit, i.e., a single semiconductor die that includes a circuit, or it may be a multichip module that includes multiple semiconductor dies in a single package and that may further include a substrate onto which the dies are mounted, and further electronic devices.

IGBT—insulated gate bipolar transistor

Lockout duration—a time span during which the electronic protection system does not reconnect a load to a raw mains supply, to allow the load to recover, for example by cooling off, after the electronic protection system has disconnected the load.

MOSFET—metal-oxide-semiconductor field-effect transistor.

Overcurrent, in the context of this document, means a current exceeding a threshold value, indicative of a fault condition.

IMPLEMENTATIONS

Figure 1:
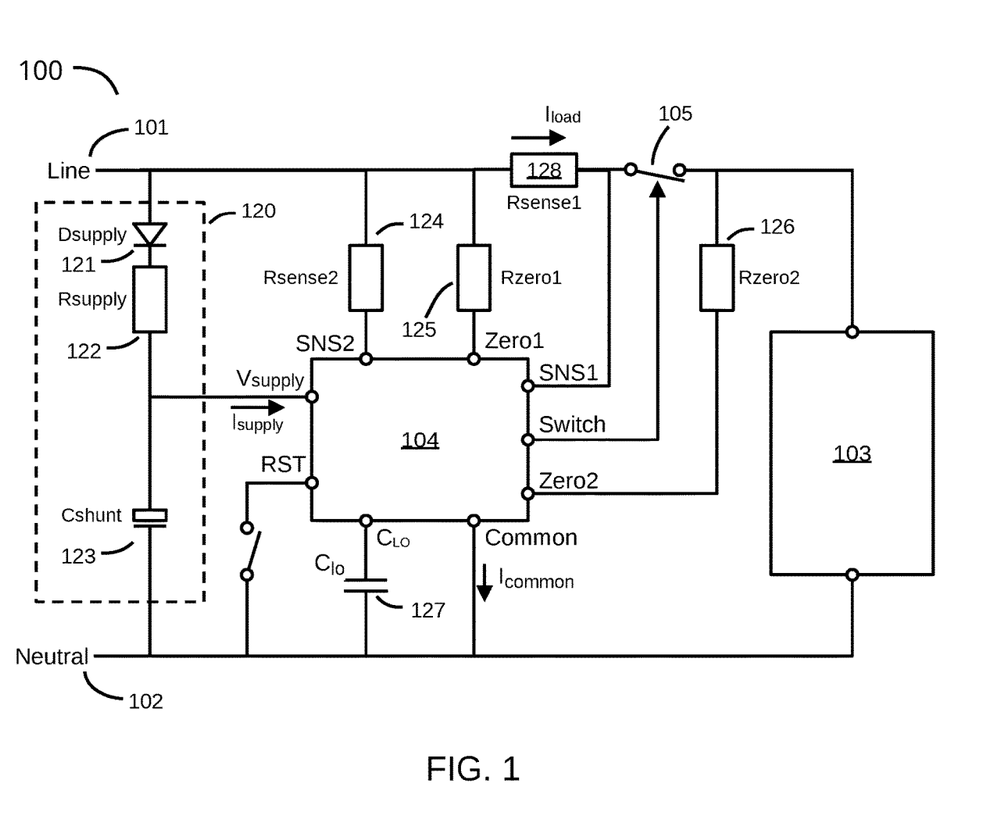
FIG. 1 shows an example low-cost electronic protection system.

FIG. 1 shows an example low-cost electronic protection system 100. Mains power lines line rail 101 and neutral rail 102 provide an external raw supply voltage for load 103. Load 103 may be coupled with the mains power lines via controllable power switch 105. To protect load 103 from excessive changes in the mains power voltage, electronic protection circuit 104 may decouple load 103 from line rail 101 using controllable power switch 105. The mains power voltage may for instance be a 110V, 60 Hz AC supply voltage as is common in the US, a 230V, 50 Hz AC supply voltage as is common in Europe, or any other AC voltage. An implementation may provide protection against overvoltage, undervoltage, overcurrent, or any combination of these. Load 103 may be or include any part of an electronic or electric system that normally uses a mains power or any other external raw supply voltage. Load 103 may include a rectifier bridge that rectifies the mains power voltage to derive a DC or direct current supply voltage. Electronic protection circuit 104 may have a supply terminal, a common terminal, a first condition sense terminal (SNS1), a zero-crossing sense terminal, and a switch driver output terminal. In some implementations, electronic protection circuit 104 may include further terminals, such as a second condition sense terminal (SNS2), a restart terminal (RST) for a reset after an overcurrent condition. Inputs and/or outputs may be single-ended or differential. In further implementations, some input terminals and/or output terminals may be combined. Electronic protection circuit 104 may be implemented in any form, including as a monolithic integrated circuit (a single-die IC), as a multichip module (MCM) that includes multiple dies placed on a substrate and packaged as a single device, as a printed circuit board (PCB) with monolithic and discrete devices, etc. An implementation may have controllable power switch 105 external to electronic protection circuit 104, or internal to it. Controllable power switch 105 has a control input that is coupled with the switch driver output terminal of electronic protection circuit 104. Some implementations use a single controllable power switch 105, other implementations may use multiple controllable power switches. Controllable power switch 105 may be, or include, any suitable electronic switch, including but not limited to an IGBT, bipolar transistor, MOSFET, super-junction MOSFET, DMOS transistor, thyristor, etc., or an electromechanical switch such as a relay, or any other switch that can be electrically controlled.

Electronic protection circuit 104 may operate at a much lower circuit supply voltage $V_{supply}$ than the external raw supply voltage between line rail 101 and neutral rail 102. This lower circuit supply voltage may be derived from the external raw supply voltage at a very low cost. For example, supply circuit 120 includes diode 121 ($D_{supply}$), resistor 122 ($R_{supply}$), and capacitor 123 ($C_{shunt}$). However, this combination may act as a current source rather than as a voltage source, delivering a current $I_{supply}$ whose size is directly dependent on the external raw supply voltage. The current $I_{supply}$ is also dependent on the internal operation of electronic protection circuit 104, and any changes in its internal operation may result in a change in the resulting supply voltage $V_{supply}$ received by electronic protection circuit 104, which may impact the height of internal thresholds, and create instability. Implementations prevent instability as described in this document. Resistor 122 typically has a high value, so that current $I_{supply}$ is very small and electronic protection system 100 can operate at a high efficiency. Although $C_{shunt}$ stabilizes the supply voltage $V_{supply}$, if $C_{shunt}$ is made too large, at power-up it will take a long time for the supply voltage to reach a value that is high enough for electronic protection circuit 104 to function. This will create a vulnerability for load 103, which is unprotected as long as electronic protection circuit 104 doesn't function. To reduce the delay at power-up, some implementations use a faster supply circuit.

To sense an occurrence of overcurrent, electronic protection system 100 may include a current sense device. The current sense device may be (or include) a current sense loop, a current sense transformer, a Hall effect sensor, a giant magneto-resistive (GMR) sensor, an inductor, or a capacitor, or simply a current sense resistor, for example resistor 128 (Rsense1), which is traversed by the current $I_{load}$ that also goes through load 103. Typically, resistor 128 has a low resistance (in the order of milliohms to tens of milliohms) to limit power loss and maintain a high efficiency. In some implementations, resistor 128 is coupled in series between load 103 and line rail 101. Electronic protection circuit 104 is coupled with both sides of resistor 128, for example via a SNS1 terminal on one side and resistor 124, resistor 125, a Reference terminal (not drawn), or a Common terminal on the other side. In some implementations, electronic protection circuit 104 has differential SNS1 terminals for sensing the voltage over resistor 128 caused by $I_{load}$. In further implementations, resistor 128 is directly coupled with one or two terminals of electronic protection circuit 104, whereas in other implementations, resistor 128 is indirectly coupled with one or two terminals of electronic protection circuit 104, for example via resistors.

The electronic protection circuit 104 is configured to turn off controllable power switch 105 within eighty (80) milliseconds from a zero crossing in power delivered by the mains power lines when a load current that has been sensed by the current sense device exceeds a threshold, i.e., when there is an overcurrent event. In some implementations, electronic protection circuit 104 switches off controllable power switch 105 within 50 microseconds, and in further implementations within 5 microseconds. In case of detecting an overcurrent, it may be dangerous to restart electronic protection circuit 104 automatically. In many cases, human intervention is necessary to remove the cause of the overcurrent and any danger that load 103 experiences as a result of the overcurrent. Therefore, electronic protection circuit 104 may include a terminal (RST) to reconnect power to load 103 after an overcurrent event.

To sense an occurrence of overvoltage (the positive peak amplitude or the negative peak amplitude of the external raw supply voltage is too high), and/or to sense an occurrence of undervoltage (the positive peak amplitude or the negative peak amplitude of the external raw supply voltage is too low), electronic protection circuit 104 senses the external raw supply voltage via resistor 124 (Rsense2). This resistor typically has a high value, so that only a little current enters electronic protection circuit 104 at its SNS2 terminal. It is possible to sense the end of an occurrence of overvoltage, and to automatically restore power delivery to load 103. This document describes how this can be achieved.

To prevent glitches due to controllable power switch 105 interrupting or reconnecting the current to load 103 after an overvoltage or undervoltage event, electronic protection circuit 104 is configured to turn off controllable power switch 105 within 3 milliseconds from a zero crossing in power delivered by the mains power lines. Such a situation is expected to occur at twice the mains frequency, for example 100 or 120 times per second. FIG. 1 depicts two ways of detecting such a "zero crossing". One way is by sensing the instantaneous voltage at both sides of controllable power switch 105, using resistor 125 ($R_{zero1}$) and resistor 126 ($R_{zero2}$). Another way is by sensing the instantaneous voltage at both sides of $R_{sense1}$. Switching may be safest when there is no voltage differential. Implementations other than the one depicted in FIG. 1 may sense zero crossings at other places, for instance as shown later with reference to FIGS. 5-6, or may use a single zero crossing sense input. Further implementations may combine the circuits for sensing zero crossings and for sensing overcurrent.

To configure one or more timing parameters, electronic protection circuit 104 may have terminals for one or more external components, such as lock-out timing capacitor 127 ($C_{lo}$) which can determine the lockout time discussed later in this document.

Figure 2A:
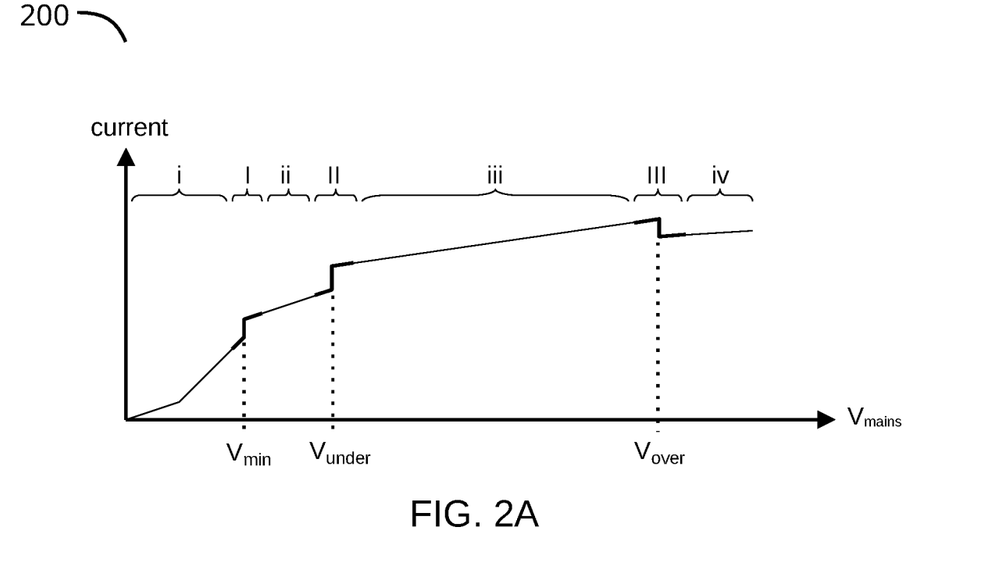
FIGS. 2A-D show example generalized graphs of the supply current drawn by an electronic protection circuit as a function of the mains voltage.

FIGS. 2A-D show example generalized graphs of the supply current drawn by an electronic protection circuit as a function of the mains voltage. FIG. 2A shows a generalized graph 200 of the supply current drawn by an electronic protection system as a function of the mains voltage. Its normal operating range is between $V_{under}$ and $V_{over}$, where the electronic protection system must maintain a connection between the mains voltage rails and the load it protects. Outside of this range, no connection is allowed. To operate reliably, an electronic protection system needs sufficient supply voltage, associated with a threshold $V_{min}$, as well as sufficient supply current. In some implementations, $V_{under}$ may not have been explicitly defined and $V_{min}$ effectively double-functions as $V_{under}$. Other implementations may not explicitly define $V_{over}$, and operation focuses on $V_{min}$ and $V_{under}$.

Electronic protection systems incorporate hysteresis in $V_{under}$ and $V_{over}$ to protect from transition instabilities. Once the main voltage crosses $V_{under}$ or $V_{over}$, hysteresis will change those threshold voltages to ensure a decisive crossing that is protected from noise below a certain margin, whose size is determined by the size of the hysteresis.

To be safe against noise and transition instabilities, the allowed range (the range is between $V_{under}$ and $V_{over}$) must be widened when the mains voltage is inside it, and narrowed when the mains voltage is outside it.

Nonlinearity in the current use at $V_{under}$ and $V_{over}$ can reduce or inverse the width of the built-in hysteresis, and cause instability. There is concern around three critical voltages: $V_{min}$ (area I), $V_{under}$ (area II), and $V_{over}$ (area III). In each of those areas, the internal mode of the electronic protection system is different, and different circuits may be active. Thus, the current as a function of the mains voltage changes in non-linear ways around the three thresholds. Since an electronic protection system has a small power budget, a relatively large change in current can result in a change of internal voltage levels, including reference voltages used for determining the threshold levels $V_{under}$ and $V_{over}$. This potentially creates a positive feedback loop, and instability.

Discontinuities outside of the areas I, II and III don't have this problem, and are of no concern for stability. Areas i (no operation), ii (undervoltage protection), iii (normal operation), and iv (overvoltage protection) may have any shape, including discontinuities and non-linearities, without adding to this problem. Also, unlike drawn in FIG. 2A, the current in areas i, ii, iii, and iv could be higher or lower than shown, the relative sizes could be different (for example, the current in area iii could be lower than in areas ii and iv), and the shape can be different than the straight line segments drawn in the areas i through iv.

During power-up and power-down, the mains voltage crosses through $V_{min}$ (area I), where the electronic protection system has insufficient voltage and/or current to operate. In this area I, it is also important to realize that a fast ramp up of the mains voltage can cause a different situation than a slow ramp up. This is because the electronic protection system has internal stabilization of its own operating power. Thus, the mains voltage sensed for normal operation may reach its terminals before the electronic protection system has fully powered up. On the other hand, the electronic protection system is likely to power down only after it has sensed that the mains voltage has suddenly been removed.

Figure 2B:
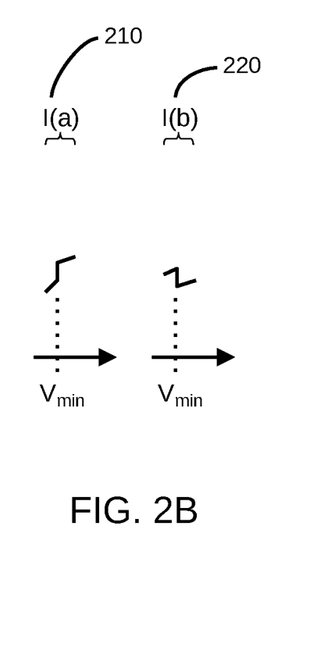

FIG. 2B shows that at $V_{min}$, the current could step up 210 (detail I(a)) or step down 220 (detail I(b)). If the current steps down, or is continuous, then there is a negative feedback loop, and the circuit is stable. If the current steps up, then there is a positive feedback loop, and the circuit is unstable. Thus, detail I(a) has an inherent instability, and step up 210 must be prevented. An implementation must ensure that at $V_{min}$ the electronic protection system has sufficient current. If not, the impact of nonlinearities is much increased, resulting in greater instability.

Figure 2C:
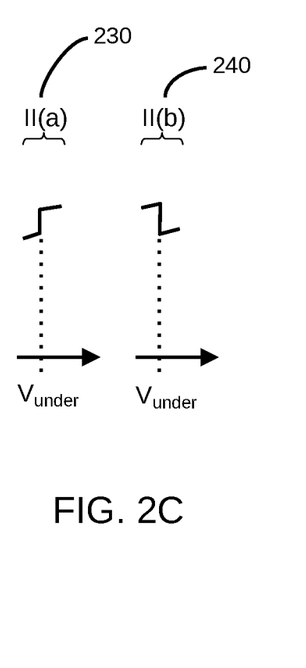

FIG. 2C shows that at $V_{under}$, the current may increase 230 or decrease 240, depending on the exact internal functions of an electronic protection system implementation. An increase (detail II(a)) is inherently unstable if it increases $V_{under}$, and inherently stable if it decreases $V_{under}$. A decrease (detail II(b)) is inherently unstable if it decreases $V_{under}$ and inherently stable if it increases $V_{under}$.

An implementation that has no explicit undervoltage protection may have or lack the capability to protect against both variations of the mains voltage (noise) and positive feedback loops due to current nonlinearities. If it lacks the capability, then undervoltage protection must be built in to guarantee stability.

Figure 2D:
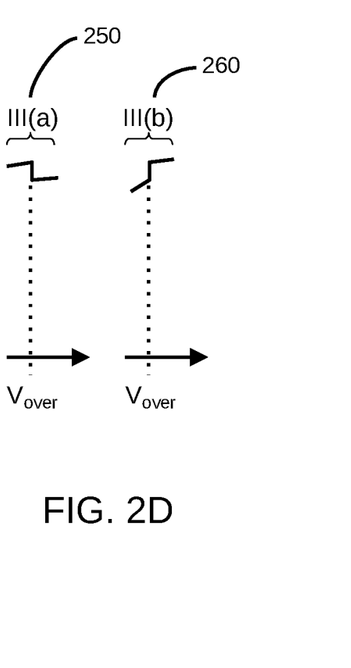

FIG. 2D shows that at $V_{over}$ the current may decrease 250 (detail III(a)) or increase 260 (detail III(b)). At the start of overvoltage protection, the allowed range must be narrowed, or more specifically, $V_{over}$ must become lower. If decrease 250 (detail III(a)) lowers the threshold voltage $V_{over}$ then the circuit is inherently stable, and if it raises the threshold voltage, the circuit is potentially unstable. Similarly, if increase 260 (detail III(b)) lowers the threshold voltage $V_{over}$, then the circuit may become instable, and if it raises $V_{over}$, then it is inherently stable.

Figure 3:
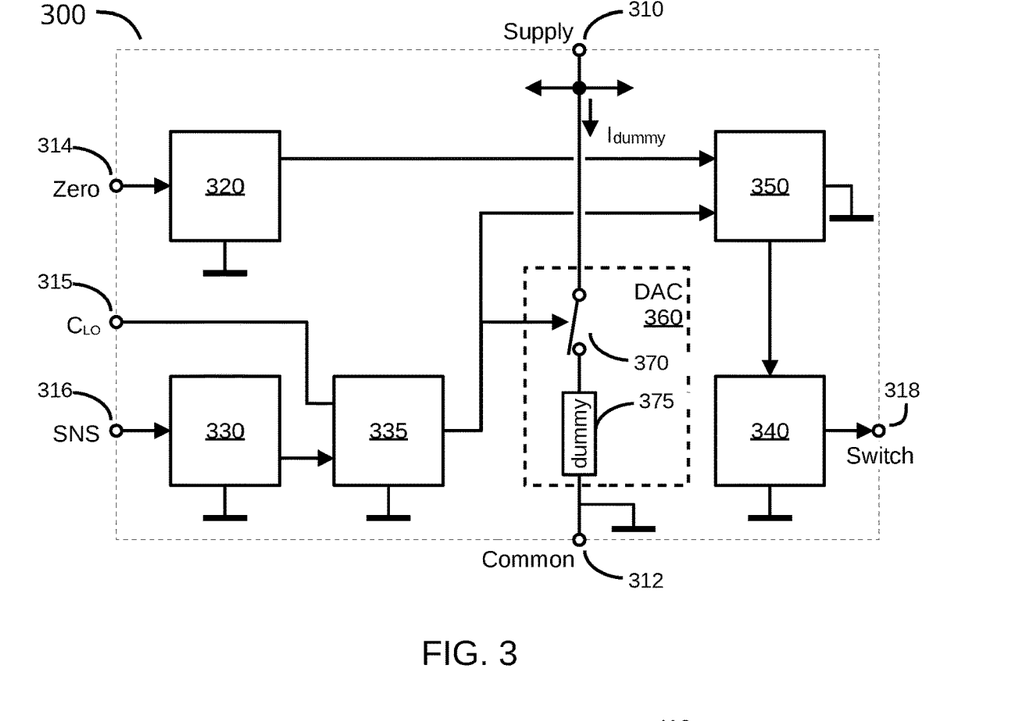
FIG. 3 illustrates a first example electronic protection circuit.
Figure 4:
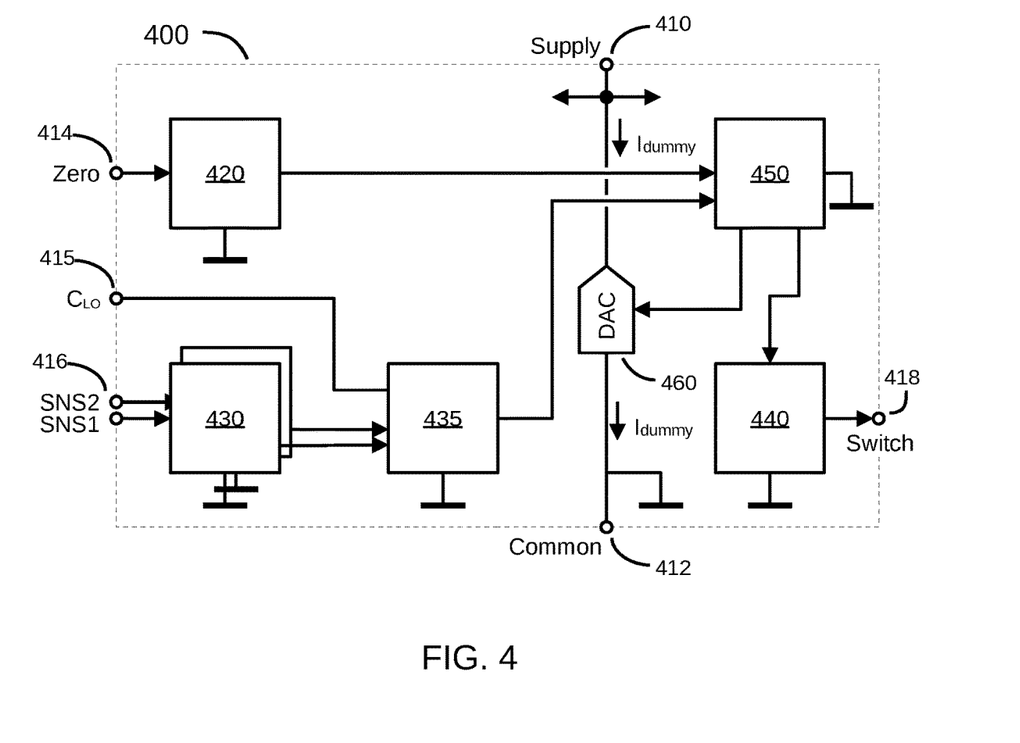
FIG. 4 illustrates a second example electronic protection circuit.
Figure 6:
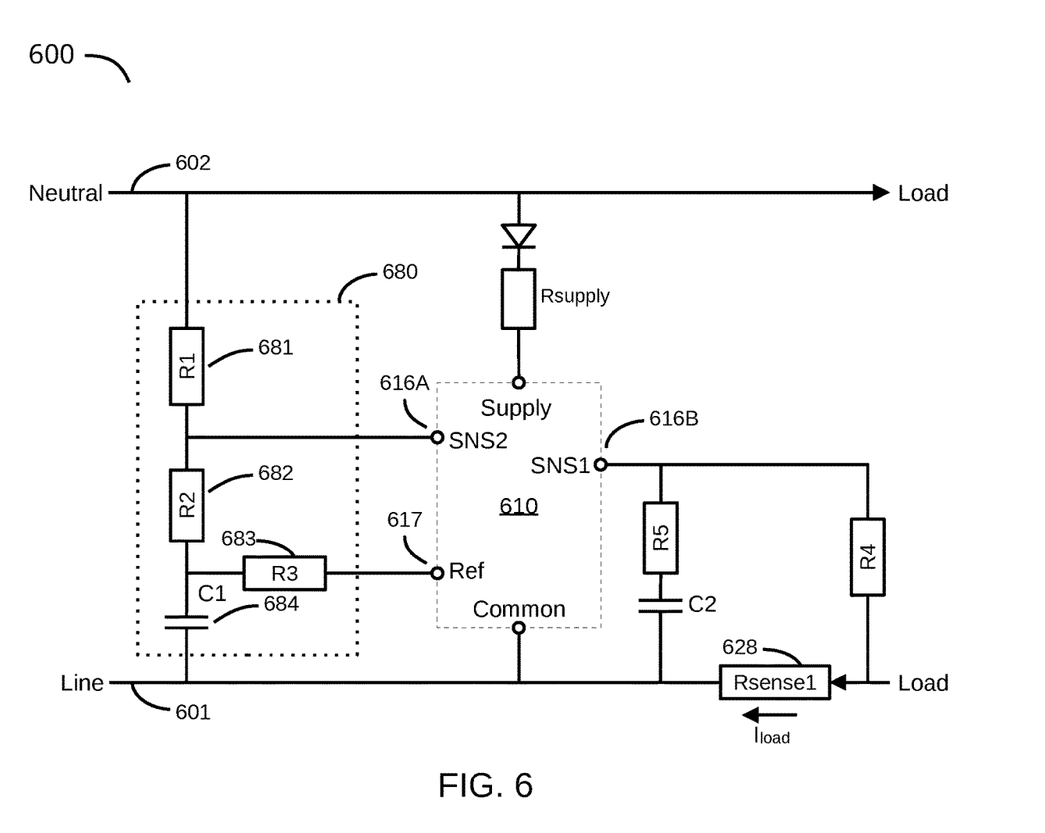
FIG. 6 illustrates details of a filter that provides power supply stability in an implementation of the electronic protection circuit with two sense inputs.

Implementations may switch one or more dummy currents on or off around the three threshold voltages $V_{min}$, $V_{under}$, and $V_{over}$. Circuits to do so are shown in FIGS. 3-4. They may further reduce currents flowing out of the pins of an electronic protection system IC by use of external filtering, as illustrated in FIG. 6.

FIG. 3 illustrates a first example electronic protection circuit 300. Electronic protection circuit 300 may be an IC, and includes supply terminal 310, common terminal 312, at least one zero crossing detector terminal 314, a sense terminal 316, and a switch terminal 318 to couple electronic protection circuit 300 to external devices to make up an electronic protection system. Electronic protection circuit 300 further includes zero crossing detector 320, in-range detector 330, switch driver 340, control unit 350, and one-bit dummy DAC 360, which may include DAC switch 370 and dummy resistor 375. An implementation may also include lockout timer 335 coupled between in-range detector 330 on one side and control unit 350 and dummy DAC 360 on the other side. In some implementations, dummy DAC 360 may have a higher resolution than one bit and includes additional switched dummy resistors. In further implementations, dummy DAC 360 includes one or more switched current sources instead of one or more switched dummy resistors. Supply terminal 310 receives a power supply current, at least a part of which it returns via common terminal 312, and any remaining parts may flow out of electronic protection circuit 300 as one or more operational currents via any of the other terminals. In some implementations, or some of the time, an operational current may have a negative sign, i.e., flow into electronic protection circuit 300 and flow out of it via common terminal 312. Supply terminal 310 uses the power supply current to generate any required internal voltage and current sources and voltage and current references, and generally distributes the power supply current among the circuits inside electronic protection circuit 300, including zero crossing detector 320, in-range detector 330, switch driver 340, control unit 350, and dummy DAC 360. Some implementations may include multiple instances of in-range detector 330 to sense multiple different conditions. For example, one instance may sense undervoltage and/or overvoltage conditions, and another instance may sense overcurrent conditions. In further implementations, in-range detector 330 may be connected to two instances of sense terminal 316 to sense differential signals.

Zero crossing detector 320 senses, via its at least one zero crossing detector terminal 314 when an external current reverses direction, i.e., crosses zero. An implementation may, for example, monitor an external raw supply voltage of 230V AC, with a mains frequency of 50 Hz. The external raw supply voltage could have a sinusoidal form, and a mains current delivered could cross through zero and reverse direction at the top and at the bottom of the voltage sinus. To accomplish this, an implementation of zero crossing detector terminal 314 may include a differentiator whose input receives (a fixed portion of) the external raw supply voltage and detect the timing of the top and the bottom of the sinus when the output of the differentiator goes from negative to positive, or vice versa, i.e., goes through zero. Zero crossing detector terminal 314 provides the zero crossing time information to control unit 350, which may include timing circuitry, combinatorial logic, a state machine, a lookup table, a hardwired processor, and/or a programmable processor.

In another implementation, zero crossing detector 320 may have two zero inputs, as depicted in FIG. 1, and a current zero crossing is detected by measuring a voltage, for example, over the external power switch. If the external power switch is a solid-state device, it will have an on-resistance of perhaps a few tens to a few hundreds of milliohms, and any current through it will create a voltage difference whose polarity is easily measured.

In-range detector 330 senses, via sense terminal 316, whether an external raw supply voltage is inside or outside an allowed range, or whether an absolute value of the external raw supply voltage is inside or outside the allowed range. The allowed range may be widened or narrowed, i.e., the allowed range may have a hysteresis. The allowed range may become narrowed once the implementation determines that the external raw supply voltage is outside the allowed range, and it may be widened once the implementation determines that the external raw supply voltage is inside the allowed range. Widening and narrowing the allowed range provides stability around the time of switching, when naturally occurring noise might otherwise cause an instable transition from one state to another state. An implementation may determine that the external raw supply voltage is outside the allowed range by comparing a peak level of the external raw supply voltage, or an absolute peak level of the external raw supply voltage, with an overvoltage threshold and an undervoltage threshold. When it becomes higher than the overvoltage threshold or lower than the undervoltage threshold then it is outside of the allowed range, and the implementation may narrow the allowed range by lowering the overvoltage threshold and/or raising the undervoltage threshold, respectively. Conversely, when it becomes lower than the overvoltage threshold or higher than the undervoltage threshold, it is inside the allowed range, and the implementation may widen the allowed range by raising the overvoltage threshold and/or lowering the undervoltage threshold. In-range detector 330 forwards a signal to control unit 350 including the result of the in-range detection and the timing of any changes in the detection result. In the implementation of electronic protection circuit 300, it also uses the result and its timing to switch DAC switch 370. In one implementation, it allows current to run through dummy DAC 360 whenever the external raw supply voltage is within the allowed range, and stops current from running through dummy DAC 360 when the external raw supply voltage is outside of the allowed range. In another implementation, it allows current to run through dummy DAC 360 whenever the external raw supply voltage is outside the allowed range, and stops current from running through dummy DAC 360 when the external raw supply voltage is inside the allowed range. In some implementations, the size of the dummy resistor is programmable. Thus, the current running through dummy DAC 360 can compensate for changes in supply current running through supply terminal 310 between the two modes: in-range, and out-of-range.

Some implementations include lockout timer 335. Lockout timer 335 has a lockout duration that may be programmable, for example through a register setting, or configurable, for example by the capacitance of a lockout time capacitor externally connected to a lockout capacitor terminal 315, or by other means, such as a resistor value, an IC bond option, a voltage applied to an external terminal of the IC, the content of a non-volatile memory or one-time-programmable memory, an IC mask option, and any other method known in the art. If the lockout duration is configured by a lockout capacitor value, lockout timer 335 may time out after one or more cycles of charging the lockout capacitor. Lockout timer 335 ensures that an out-of-range signal from the in-range detector is always passed on for at least the lockout duration. This allows an external load some thermal recovery time after the electronic protection circuit has disconnected the load from the mains supply lines following detection of a dangerous condition. If lockout timer 335 receives an out-of-range signal from in-range detector 330, then in some implementations lockout timer 335 ensures that its output signal copies the out-of-range signal for at least the lockout duration, and in other implementations lockout timer 335 ensures that its out-of-range output signal continues past the end of its out-of-range input signal for at least the lockout duration. At other times, lockout timer 335 copies its in-range input signal to the output.

Switch driver 340 includes a buffer to drive at least one power switch, such as an IGBT, bipolar transistor, MOSFET, super-junction MOSFET, DMOS transistor, thyristor, etc., where the power switch or switches couple the external raw supply voltage to or with a load to be protected. Switch driver 340 may further include timing circuitry, for example to operate the power switch or switches with one or more delays, that may be programmable.

Control unit 350 controls switch driver 340, based on the information it receives from zero crossing detector 320 and in-range detector 330. In particular, its function includes determining from in-range detector 330 when the external raw supply voltage goes out of range, then waiting for a signal from zero crossing detector 320 that a zero crossing occurs, and then instructing switch driver 340 to turn off the power switches.

FIG. 4 illustrates a second example electronic protection circuit 400. Electronic protection circuit 400 includes all elements of electronic protection circuit 300, with likewise functionality and drawn with likewise reference numbers. This includes supply terminal 410, common terminal 412, zero crossing detector input 414, lockout configuration terminal 415 ($C_{LO}$), sense input 416 (with a SNS1 terminal and a SNS2 terminal), switch driver output 418, lockout timer 435, and switch driver 440. However, in this implementation, control unit 450 instead of in-range detector 430 controls dummy DAC 460. The implementation may include two (or more) instances of in-range detector 430. The instances may be identical. The implementation and operation of in-range detector 430 may be as described with respect to the example overcurrent sense circuit 507 in FIG. 5B. The timing is such that control unit 450 changes dummy DAC 460 no earlier than that it receives a change from in-range detector 430, and no later than that it processes a change from zero crossing detector 420. In this manner, the operation of electronic protection circuit 300 and electronic protection circuit 400 is substantially the same, but with the added possibility to control the timing and size of the current through dummy DAC 460. Dummy DAC 460 may be implemented with one or more switched dummy resistors, as in FIG. 3, or with switched current sources, or as any other DAC with current output known in the art. A further difference is that FIG. 4 depicts two instances of in-range detector 430. The number of instances is optional, and implementations may have any number of instances of in-range detector 430 to detect any number of conditions.

Figure 5A:
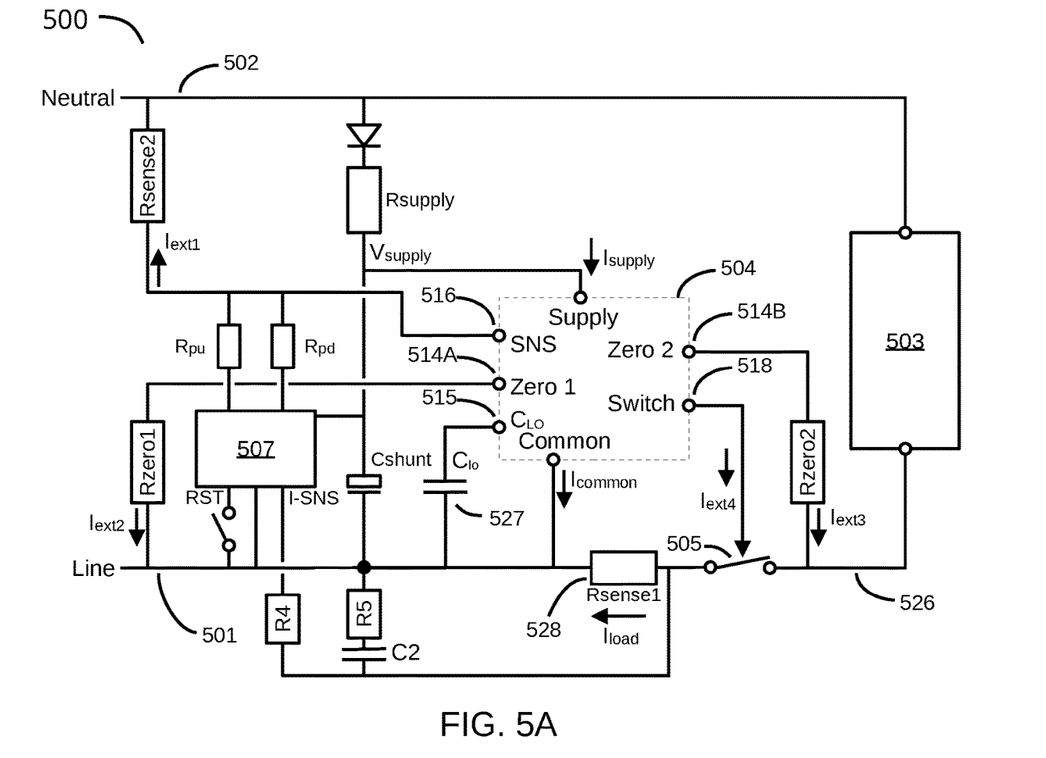
FIG. 5A illustrates an example electronic protection system with an electronic protection circuit that has a single sense input.

FIG. 5A illustrates an example electronic protection system 500 with an electronic protection circuit 504 that has a single sense input SNS. It also includes an overcurrent sense circuit 507 that may be implemented as a separate IC to pair with electronic protection circuit 504. Mains power lines neutral rail 502 and line rail 501 provide an external raw supply voltage for load 503. Load 503 may be coupled with the mains power lines via controllable power switch 505. Note that compared with FIG. 1, the roles of line rail 501 and neutral rail 502 have reversed. Whereas in FIG. 1 $V_{supply}$ is positive with respect to neutral rail 102, in FIG. 5A $V_{supply}$ is positive with respect to line rail 501. Implementations may use either configuration. However, note that in both configurations the power switch and the sense resistor are in series with the line rail. Electronic protection system 500 has many devices in common with electronic protection system 100, some of which are not numbered or further explained here as their functions are the same as those in FIG. 1.

Electronic protection circuit 504 has several terminals through which it is coupled with devices shown externally. For example, electronic protection circuit 504 includes zero sense terminal 514A and zero sense terminal 514B, lockout configuration terminal 515 ($C_{LO}$) to couple with lockout timing capacitor 527 ($C_{lo}$), sense terminal 516 (SNS) to sense external conditions, and switch terminal 518 to control controllable power switch 505. It further includes a supply terminal to receive a supply current $I_{supply}$, and a common terminal to return the supply current.

Figure 5B:
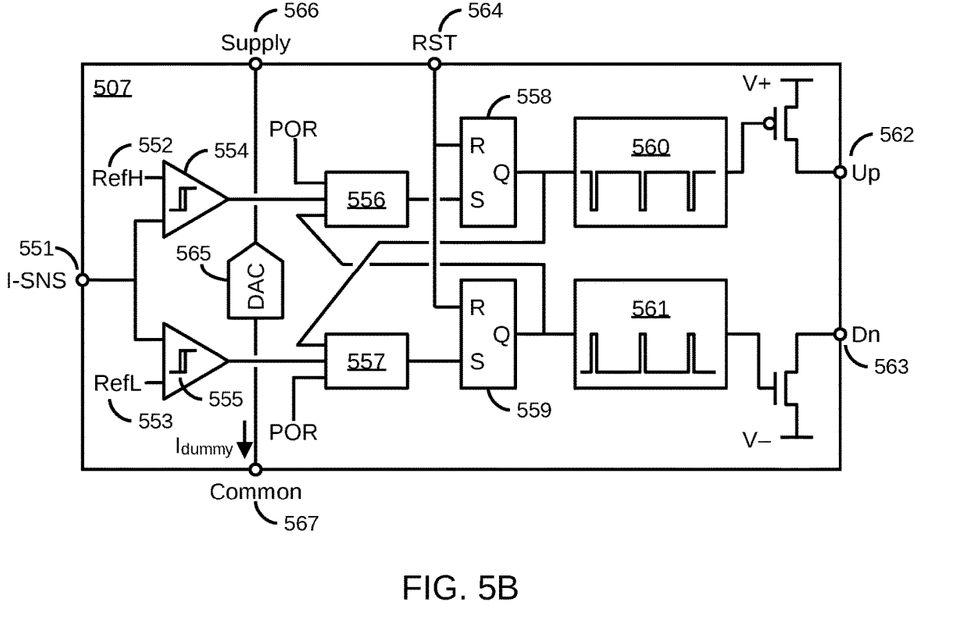
FIG. 5B shows an example implementation of an overcurrent sense circuit.

FIG. 5B shows an example implementation of overcurrent sense circuit 507. Overcurrent sense circuit 507 has a sense input terminal 551 (I-SNS), a pull-up output 562 (Up), which may be either high-impedance without a signal, or pulling up an external node to a higher voltage V+ (for example, the supply voltage at the supply terminal 566), a pull-down output 563, which may be either high-impedance without a signal, or pulling down an external node to a lower voltage V− (e.g., the voltage at the common terminal 567). Overcurrent sense circuit 507 may further have a reset terminal 564 (RST) to restart operation of electronic protection system 500 after an overcurrent condition has occurred, and a user has removed the cause of the condition.

Overcurrent sense circuit 507 includes a first comparator 554 that compares a signal at sense input terminal 551 with a first reference value 552 (RefH) and a second comparator 555 that compares the signal at sense input terminal 551 with a second reference value 553 (RefL). An output of first comparator 554 is coupled with first combinational logic circuit 556, and an output of second comparator 555 is coupled with second combinational logic circuit 557. An output of first combinational logic circuit 556 can set first latch 558 and an output of second combinational logic circuit 557 can set second latch 559. Both latches are coupled with reset terminal 564 and are reset when reset terminal 564 is asserted. First combinational logic circuit 556 further receives a power-on reset (POR) signal at an input, and an output signal of second latch 559. Second combinational logic circuit 557 further receives the POR signal at an input, and an output signal of first latch 558. The function of first combinational logic circuit 556 and second combinational logic circuit 557 is to ensure that when first comparator 554 is triggered or second comparator 555 is triggered, the corresponding first latch 558 or second latch 559 is set, but not before the POR signal is available, and not if the other latch is active. For example, if the SNS signal at sense input terminal 551 exceeds RefH, then first comparator 554 asserts its output, which via first combinational logic circuit 556 will set first latch 558. Once first latch 558 is set, second latch 559 cannot be set and the state of the latches will not change until the user asserts reset terminal 564. Similarly, if the SNS signal goes below RefL, second comparator 555 asserts its output, which via second combinational logic circuit 557 will set second latch 559. Once second latch 559 is set, first latch 558 cannot be set and the state of the latches will not change until the user asserts reset terminal 564. Although FIG. 5B does not show the POR circuit that generates the POR signal, the POR circuit may delay the POR signal with a delay time to match or track internal processes of electronic protection circuit 504. For example, dependent on the supply voltage configuration, the supply voltage circuitry and electronic protection circuit 504 may take a while to reach sufficient level to begin working. Similarly, it may take a while before overcurrent sense circuit 507 operates. In implementations, it may be needed that overcurrent sense circuit 507 is ready to operate just before electronic protection circuit 504, so that if an overcurrent situation is present at startup, overcurrent sense circuit 507 can immediately instruct electronic protection circuit 504 to switch off.

A pulse generator 560 generates a train of pulses when first latch 558 is set. The pulse train may have a low duty cycle, for example, the pulse may have a duration of 800 microseconds, followed by a pause of 6.8 milliseconds. More generally, the duty cycle may be below thirty-three percent (33%). Similarly, pulse generator 561, which too may have a low duty cycle, generates a train of pulses when second latch 559 is set. Pulse generator 560 pulls up pull-up output 562, for example via a P-type transistor that couples pull-up output 562 with V+. Pulse generator 561 pulls down pull-down output 563, for example via an N-type transistor that couples pull-down output 563 with V−. The V+ node may be coupled with supply terminal 566, and the V− node may be coupled with common terminal 567. Since first latch 558 and second latch 559 cannot be active at the same time, pulse generator 560 and pulse generator 561 cannot be active at the same time.

Some implementations of overcurrent sense circuit 507 may further include a dummy DAC 565 (controlled by the output signals of the comparators) between the supply and common terminals to ensure that the supply current drawn by overcurrent sense circuit 507 causes no instability to electronic protection system 500 when sensed conditions change. The comparators may—or may not—have hysteresis to prevent noisy transitions from one state to another state. Some implementations may include all elements shown in FIG. 5B, whereas other implementations may include only part of the elements shown, dependent on the desired functionality. Further implementations may include level shifters. Some implementations may include reference circuits to obtain RefH and RefL, whereas other implementations may obtain RefH and RefL externally via additional terminals.

In FIG. 5A, overcurrent sense circuit 507, the voltage over resistor 528 is proportional with $I_{load}$. It is measured via resistor R4 between the I-SNS input and the common terminal that is coupled with line rail 501. The Up and Dn terminals are coupled with sense terminal 516 of electronic protection circuit 504 via resistors Rpu and Ppd. FIG. 5A further shows a low-pass filter R5 and C2, which helps align the timing of overcurrent sense circuit 507 with electronic protection circuit 504. Implementations may further include a level shifter. Some implementations combine resistors Rpu and Rpd in a single resistor, or include their functions in overcurrent sense circuit 507.

In some implementations, electronic protection circuit 504 features one or two inputs to detect a zero crossing, e.g., zero sense terminal 514A and zero sense terminal 514B. Electronic protection system 500 operates on neutral rail 502 and line rail 501, between which the external raw supply voltage is applied. Electronic protection circuit 504 has a common terminal coupled with line rail 501. Electronic protection circuit 504 receives its supply current via, for example, a resistor $R_{supply}$. Its supply terminal may be shunted to line rail 501 with a decoupling capacitor $C_{shunt}$ (for example, as drawn). The implementation senses overvoltage and undervoltage conditions via sense terminal 516 which is coupled to neutral rail 502 via, for example, a large resistor $R_{sense1}$. The implementation senses zero crossings by sensing if there is a zero-voltage differential between line rail 501 and load node 526. Zero-crossing sensing is done via two large resistors $R_{zero1}$ and $R_{zero2}$, one of which each protects zero sense terminal 514A and zero sense terminal 514B. If an implementation of electronic protection circuit 504 includes a lockout timer, it may have a lockout configuration terminal 515 to connect to an lockout timing capacitor 527 that configures the lockout duration.

In this example electronic protection system 500, it is possible that neutral rail 502 is within an allowed range when electronic protection circuit 504 is still in the process of powering up. It takes time to charge $C_{shunt}$ through $R_{supply}$ to a supply voltage that is sufficient for electronic protection circuit 504 to fully operate, whereas the voltage at neutral rail 502 is sensed imminently via Rsense. Controllable power switch 505 is off (in a properly functioning implementation) when electronic protection circuit 504 has insufficient supply. When a sufficient supply voltage is reached, the implementation switches these switches on, because the in-range detector senses that the external raw supply voltage is within the allowed range.

It is also possible that the external raw supply voltage starts slow compared to the time to charge $C_{shunt}$ through $R_{supply}$, or that the external raw supply voltage is otherwise not in range. Controllable power switch 505 is disconnected. The allowed range is narrowed. Upon reaching the undervoltage threshold, the allowed range widens and controllable power switch 505 couples line rail 501 to load node 526, so that the external raw supply voltage is applied to load 503 load 503. The implementation maintains this status until the external raw supply voltage drops below or increases above the widened allowed range.

FIG. 5A depicts one of several architectures in which electronic protection circuit 504 may be used to create an electronic protection system. Other implementations might couple the electronic protection circuit 504 common terminal with the neutral rail 502 instead of line rail 501; they may use switches to decouple both sides of the load (in this case, load 503 load 503) from the mains supply rails; and they may use a circuit different than a diode, $R_{supply}$, and $C_{shunt}$ to feed electronic protection circuit 504. All those variations are within the scope of the disclosed technology. For practical purposes, the example implementation in FIGS. 5A-B may be among the lowest cost implementations. It is also a reason why the circuit in FIG. 6 may sometimes be needed to further reduce and/or eliminate positive feedback problems.

FIG. 6 illustrates details 600 of a filter 680 that provides further power supply stability in an implementation of the electronic protection circuit with two sense inputs. The implementation uses filter 680 to reduce currents through the pins of electronic protection IC 610, thereby reducing the size of nonlinearities in its supply current as a function of the external raw voltage, and thus reducing positive feedback that result from the nonlinearities. As long as the total effect of any positive feedback is small relative to the size of the hysteresis in the allowed range, the transitions occurring at the threshold voltages can be stable and decisive. An electronic protection circuit generally needs to sense both positive and negative signals. To do so easily would require the IC to have both a positive and a negative supply voltage, referenced to a common node. However, a lower cost alternative is to use an IC with a single power supply, for instance using a positive supply terminal and a common terminal. A reference voltage terminal, which outputs a reference voltage higher than the common terminal potential and lower than the supply terminal potential, may then be used as a reference for sensing both positive and negative overvoltage and undervoltage conditions. The reference voltage terminal, during the operation of sensing whether the raw supply voltage is within range, alternately sources and sinks sense currents, dependent on the instantaneous voltage of the raw supply voltage. The size of the sense currents may be significant compared to the amount of supply current taken by the whole IC, which jeopardizes its operational stability. FIG. 6 includes electronic protection IC 610 with first sense terminal 616A (SNS2), second sense terminal 616B (SNS1), and reference voltage terminal 617. Second sense terminal 616B measures the load current $I_{load}$ by measuring the voltage across current sense resistor 628 ($R_{sense1}$). The electronic protection IC 610 draws its supply current from neutral rail 602, via a rectifier diode and resistor $R_{supply}$, or via any other circuit that provides a supply voltage lower than the positive maximum voltage on neutral rail 602, and returns the supply current to line rail 601. As mentioned, even though first sense terminal 616A can have a high impedance and may not impact the supply current much, reference voltage terminal 617 can have a low impedance and may source and sink significant current. Filter 680 divides down the voltage between neutral rail 602 and reference voltage terminal 617 via the divider R1 681 and R2 682. The divided voltage at first sense terminal 616A roughly equals:

$$V_{616A} = \frac{R_2 * (V_{620} - V_{ref})}{R_1 + R_2} \qquad (1)$$

Without resistor 683 and capacitor 684, electronic protection IC 610 would source or sink a current from or into reference voltage terminal 617 equal to the voltage over $R_1+R_2$ divided by $R_1+R_2$. As mentioned, this may be unacceptable, and resistor 683 with capacitor 684 provides protection by drawing most of that current, at the mains frequency, from line rail 601. For example, if the impedance of capacitor 684 at the mains frequency equals 10% of the resistance of resistor 683, then the amount of current sourced or sinked by reference voltage terminal 617 is reduced by 90%.

The load current $I_{load}$ is sensed by current sense resistor 628 ($R_{sense1}$). The sense voltage over $R_{sense1}$ may be applied to the SNS1 input terminal via resistor R4, which may be part of a level shift circuit. A low-pass filter R5 and C2 (in combination with R4) may delay the sensed signal as required by an application. Some implementations include an internal circuit that creates an overcurrent blanking delay, for example digitally, instead of or in addition to the external low-pass filter R5/C2.

Figure 7:
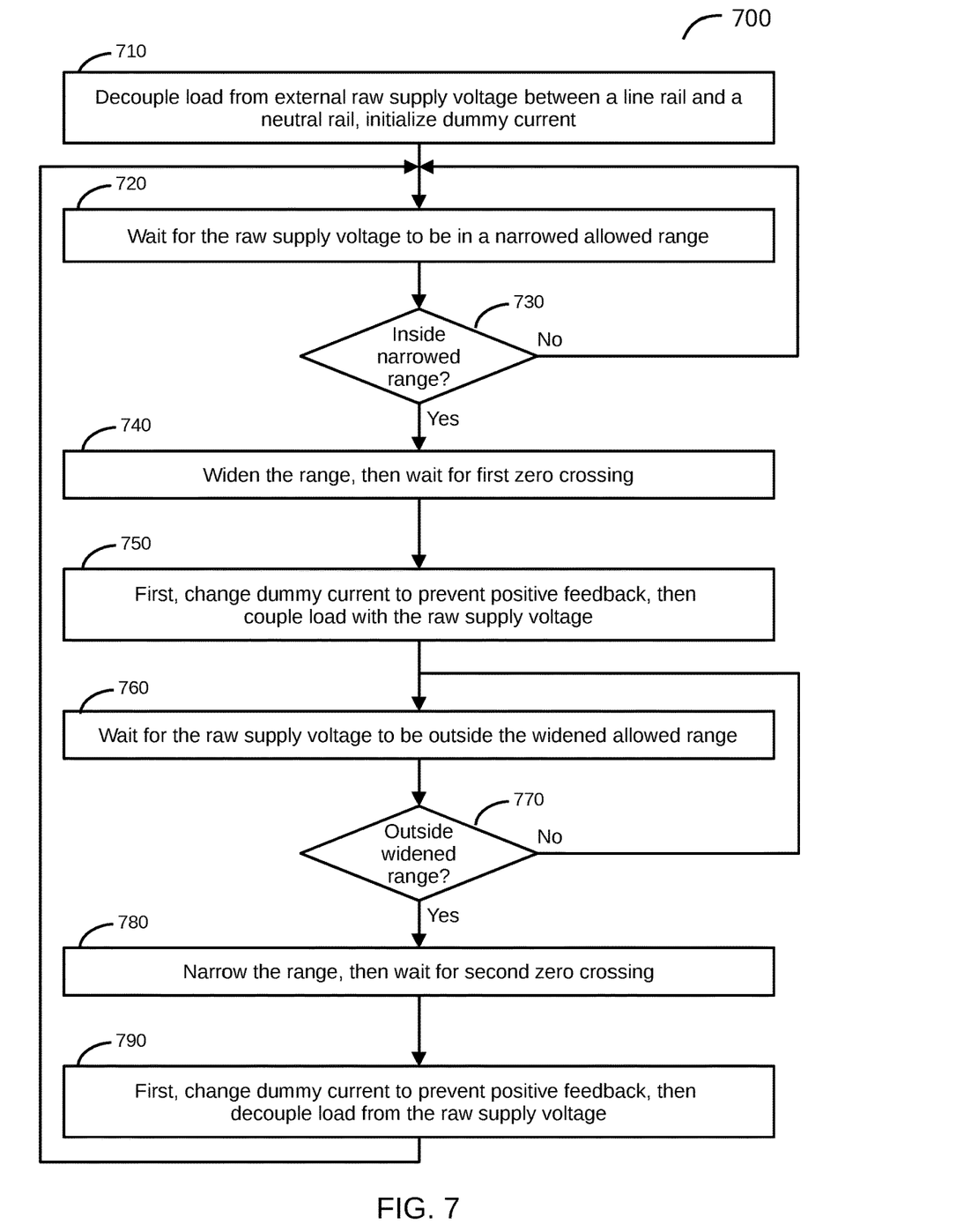
FIG. 7 illustrates a method for protecting against overvoltage and undervoltage conditions in an implementation of the disclosed technology.

FIG. 7 illustrates a method 700 for protecting against overvoltage and undervoltage conditions in an implementation of the disclosed technology. Method 700 includes the following steps, which may be performed in a continuous loop following its first step.

Step 710—using an electronic protection system, decoupling an external load from an external raw supply voltage between a line rail and a neutral rail, and initializing a dummy current in a protection IC. The protection IC provides a first switch signal to a switch to decouple the load from the raw supply voltage The external raw supply voltage may be, for instance, from an external mains supply. The external load may be, or include, a rectifier bridge or any other device, circuit, or system that needs to be protected from overvoltage and/or undervoltage. The implementation initializes the dummy current at a first value based on whether the electronic protection system receives sufficient supply voltage and sufficient supply current to fully operate, and based on whether a peak value of the raw supply voltage falls in a narrowed allowed range. The allowed range is defined as the range between the overvoltage threshold and the undervoltage threshold. Some implementations monitor one polarity of the raw supply voltage, whereas other implementations monitor both polarities, or an absolute value of the raw supply voltage.

Step 720—determining if the peak value of the raw supply voltage is in the narrowed allowed range. An implementation provides a raw supply voltage sense signal to the protection IC, which determines if the peak value of the raw supply voltage is in a narrowed allowed range by comparing the raw supply voltage sense signal with first window threshold values.

Step 730—upon determining that the peak value of the raw supply voltage is not in the narrowed allowed range, returning to Step 720.

Step 740—upon determining that the peak value of the raw supply voltage is in the narrowed allowed range, widening the allowed range and then waiting for a first zero crossing. To widen the allowed range, an implementation may raise an overvoltage threshold and/or lower an undervoltage threshold to second window threshold values. The first zero crossing may be defined as a moment when the raw supply voltage equals zero or as a moment when a voltage over the switch equals zero. The implementation may wait for the zero-voltage time to avoid high voltage transients when coupling the load to the raw supply voltage.

Step 750—changing the dummy current to a second value, and then coupling the load with the raw supply voltage. The second value of the dummy current is a value that prevents positive feedback that would result in significant narrowing of the widened allowed range during the coupling of the load with the raw supply voltage. The protection IC provides a second switch signal to the switch to couple the load with the raw supply voltage.

Step 760—determining if the peak value of the raw supply voltage is outside the widened allowed range. The protection IC compares the raw supply voltage sense signal with the second window threshold values.

Step 770—upon determining that the peak value of the raw supply voltage is not outside the widened allowed range, returning to Step 760.

Step 780—upon determining that the peak value of the raw supply voltage is outside the widened allowed range, narrowing the allowed range and then waiting for a second zero crossing. To narrow the allowed range, an implementation may lower the overvoltage threshold and/or raise the undervoltage threshold. The second zero crossing is defined as a moment when a current delivered by the raw supply voltage equals zero. In an alternating current (AC) environment, this is the moment that the current changes direction. The implementation waits for the zero-current time to avoid high voltage transients due to interrupting the load from the raw supply voltage, where the current may run through any inductive impedances associated with the electronic protection system or the load.

Step 790—first, changing the dummy current to a third value, and then decoupling the load from the raw supply voltage. The third value of the dummy current is a value that prevents positive feedback that would result in significant widening of the narrowed allowed range during the decoupling of the load from the raw supply voltage. Then, an implementation may return to Step 720.

Figure 8:
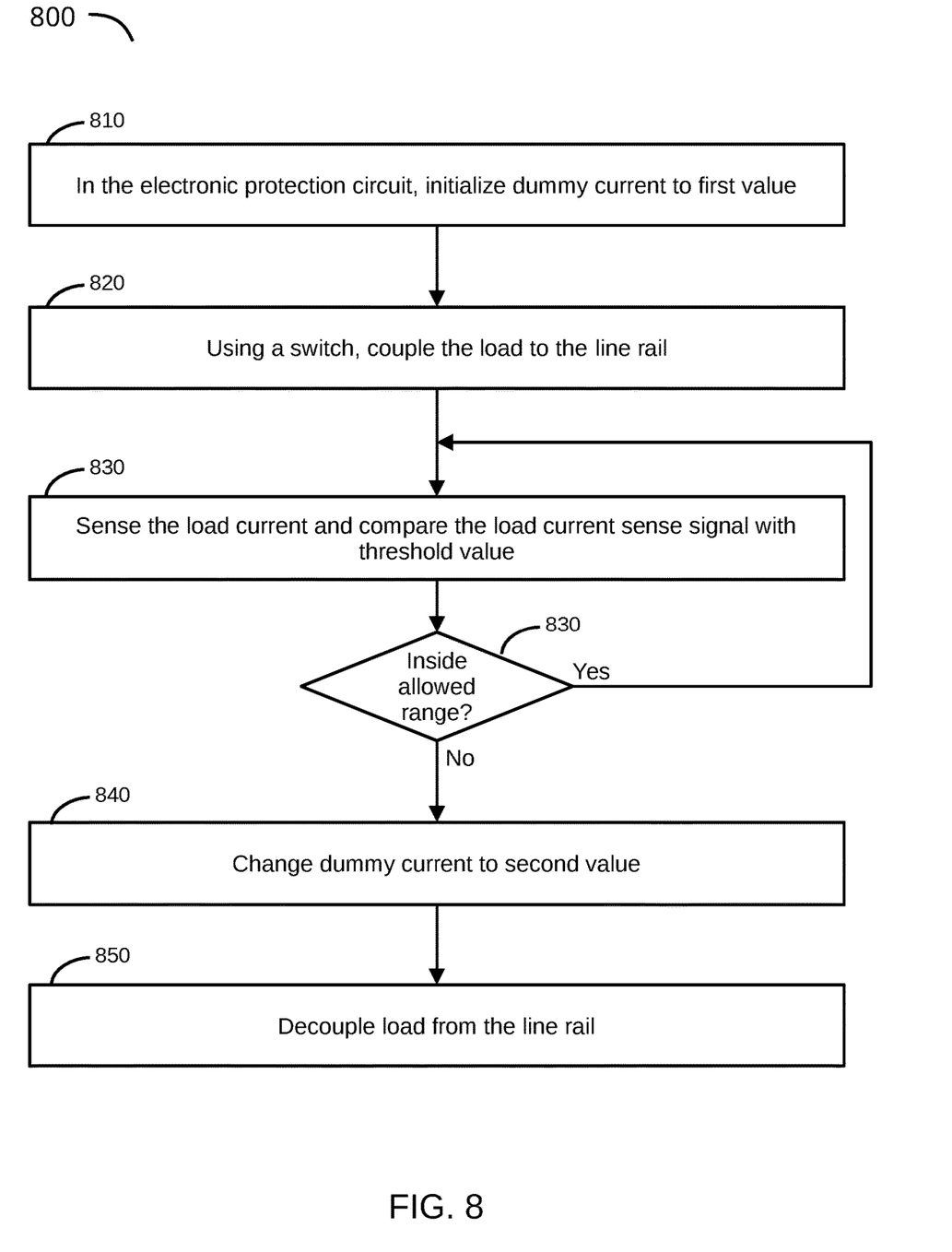
FIG. 8 illustrates an example method for protecting a load from overcurrent conditions in a load current delivered from a line rail and a neutral rail to the load.

FIG. 8 illustrates an example method 800 for protecting a load from overcurrent in a load current delivered from a line rail and a neutral rail to the load. Method 800 includes the following steps.

Step 810—In an electronic protection circuit, initialize a dummy current to a first value. The dummy current may run between a supply terminal and a common terminal of the electronic protection circuit.

Step 820—From the electronic protection circuit, provide a first switch signal to a switch to couple the load to the line rail. The switch is coupled between the load and the line rail. Some implementations may have multiple switches, for example on both sides of the load, or multiple switches on one or each side of the load.

Step 830—Provide a load current sense signal to the electronic protection circuit. In the electronic protection circuit, determine if the peak value of the load current is in an allowed range by comparing the load current sense signal with a threshold value. Implementations that protect against overcurrent may compare the load current with a single threshold value. Implementations that protect against both overcurrent and some other condition may compare the load current with two (or more) thresholds. Upon determining that the peak value of the load current is in the allowed range, repeat Step 830.

Step 840—Upon determining that the peak value of the load current is not in the allowed range, change the dummy current to a second value to prevent instability.

Step 850—From the electronic protection circuit, provide a second switch signal to the switch to decouple the load from the line rail.

CONSIDERATIONS

Although the description has been described with respect to particular implementations thereof, these particular implementations are merely illustrative, and not restrictive. For example, FIGS. 3-4 depict electronic protection circuits operating from a positive supply voltage with reference to a common terminal. However, all parts of the disclosed technology can be equally applied to electronic protection circuits operating from a negative supply voltage with reference to the common terminal. Further, some examples given illustrate circuits that use the line rail as a ground reference, whereas other implementations may use the neutral rail as a ground reference. Examples provide the supply current for the electronic protection system via a resistor, whereas other implementations may use a switched power supply to power the fuse circuits. Some implementations may only provide overvoltage protection, whereas other implementations provide only undervoltage or both overvoltage and undervoltage protection. FIGS. 3-4 illustrate implementations in which power switches are external to an integrated circuit with the electronic protection system control. However, some implementations may include the power switches.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board PCB using off-the-shelf devices, in a System-on-Chip (SoC), application-specific integrated circuit (ASIC), programmable processor, or in a programmable logic device such as a field-programmable gate array (FPGA), obviating a need for at least part of the dedicated hardware. All such variations and modifications are to be considered within the ambit of the present disclosed technology the nature of which is to be determined from the foregoing description.

Any suitable technology for manufacturing electronic devices can be used to implement the circuits of particular implementations, including CMOS, FinFET, BiCMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular implementations. In some particular implementations, multiple elements, devices, or circuits shown as sequential in this specification can be operating in parallel.

Particular implementations may be implemented by using application-specific integrated circuits, optical, chemical, biological, quantum or nanoengineered systems, etc. Other components and mechanisms may be used. In general, the functions of particular implementations can be achieved by any means as is known in the art.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

We claim:

1. An overcurrent sense circuit, comprising:
   a sense input;
   a first comparator with a first comparator input coupled with the sense input and a second comparator input coupled with a first reference;
   a first latch with a first set input (S) coupled with an output of the first comparator, a first reset input (R) coupled with a reset terminal, and a first output (Q); and
   a first pulse generator with an input coupled with the first latch output Q and an output coupled with a first overcurrent sense circuit output terminal,
   wherein the first pulse generator has a duty cycle below thirty-three (33) percent.

2. The overcurrent sense circuit of claim 1, further comprising:
   a second comparator with a second comparator input coupled with the sense input and a second comparator input coupled with a second reference;
   a second latch with a second set input(S) coupled with an output of the second comparator, a second reset input (R) coupled with the reset terminal, and a second output (Q); and
   a second pulse generator with an input coupled with the second latch output Q and an output coupled with a second overcurrent sense circuit output terminal,
   wherein the second pulse generator has a duty cycle below thirty-three (33) percent.

3. The overcurrent sense circuit of claim 2 wherein:
   the second overcurrent sense circuit output terminal acts as a current sink.

4. The overcurrent sense circuit of claim 2, further comprising:
   a dummy digital-to-analog converter (DAC) configured to draw a dummy current from a supply terminal to a common terminal after a sensed condition changes and before the second latch changes from or to a first stable latch state.

5. The overcurrent sense circuit of claim 1, further comprising:
   a dummy digital-to-analog converter (DAC) configured to draw a dummy current from a supply terminal to a common terminal after a sensed condition changes and before the first latch changes from or to a first stable latch state.

6. The overcurrent sense circuit of claim 1, wherein:
   the first overcurrent sense circuit output terminal acts as a current source.

7. The overcurrent sense circuit of claim 1, wherein:
   the sense input is single ended.

8. The overcurrent sense circuit of claim 1, wherein:
   the sense input is a differential input.

* * * * *